US007002466B2

(12) United States Patent
Goehring

(10) Patent No.: US 7,002,466 B2
(45) Date of Patent: Feb. 21, 2006

(54) EMERGENCY ALERT SYSTEMS

(75) Inventor: Michael D. Goehring, Jud, ND (US)

(73) Assignee: Great Plains Assistance Dogs Foundation, Inc., Jud, ND (US)

(*) Notice: Subject to any disclaimer, the term of this patent is extended or adjusted under 35 U.S.C. 154(b) by 46 days.

(21) Appl. No.: 10/614,711

(22) Filed: Jul. 7, 2003

(65) Prior Publication Data

US 2004/0008116 A1 Jan. 15, 2004

Related U.S. Application Data

(60) Provisional application No. 60/394,359, filed on Jul. 8, 2002.

(51) Int. Cl.
*G08B 1/08* (2006.01)
*H04Q 7/00* (2006.01)

(52) U.S. Cl. ............... 340/539; 340/539.11; 340/568.4

(58) Field of Classification Search ............. 340/573.1, 340/573.3, 568.4, 568.2–3, 533, 539.11, 539.22
See application file for complete search history.

(56) References Cited

U.S. PATENT DOCUMENTS

| | | | | |
|---|---|---|---|---|
| 3,614,326 | A * | 10/1971 | Cameron | 455/403 |
| 4,037,158 | A | 7/1977 | Eastmond | |
| 4,476,469 | A | 10/1984 | Lander | |
| 4,593,273 | A * | 6/1986 | Narcisse | 340/573.4 |
| 4,606,073 | A | 8/1986 | Moore | |
| 4,897,630 | A | 1/1990 | Nykerk | |
| 5,512,881 | A * | 4/1996 | Majmudar | 340/574 |
| 5,635,908 | A | 6/1997 | Soper | |
| 5,903,219 | A * | 5/1999 | Chen | 340/574 |
| 5,929,761 | A * | 7/1999 | Van der Laan et al. | 340/573.1 |
| 6,067,018 | A | 5/2000 | Skelton et al. | |
| 6,275,164 | B1 * | 8/2001 | MacConnell et al. | 340/692 |
| 6,281,800 | B1 * | 8/2001 | Sizemore | 340/574 |
| 6,310,553 | B1 * | 10/2001 | Dance | 340/573.3 |
| 6,415,158 | B1 * | 7/2002 | King et al. | 455/552.1 |

FOREIGN PATENT DOCUMENTS

WO WO 03/084004 A1 * 4/2002

* cited by examiner

*Primary Examiner*—Daniel Wu
*Assistant Examiner*—Travis Hunnings
(74) *Attorney, Agent, or Firm*—Anthony G. Eggink; Katrina M. Eggink

(57) ABSTRACT

An emergency alert system comprising a two-way radio system having a first radio apparatus and a second radio apparatus. The first radio apparatus has a call activation device incorporated into its circuitry. A jack with a toggle member attached thereto may be provided for insertion into a jack receptacle of the transmitting apparatus. Removal of the jack by a service dog pulling on the toggle member causes a distress signal to be sent to the second radio apparatus.

20 Claims, 4 Drawing Sheets

EMERGENCY ALERT SYSTEMS

This application claims the benefit of U.S. Provisional Patent Application No. 60/394,359, filed on Jul. 8, 2002.

BACKGROUND OF THE INVENTION

This invention relates generally to emergency alert systems and particularly to emergency alert systems for use with assistance dogs.

The emergency alert systems of the invention essentially comprise modified two-way radio systems wherein a signal activation means is installed in one of the radio apparatus. The signal activation means may include several forms including a toggle member attached to a flexible cord which when pulled from the radio apparatus activates the transmitting radio apparatus to thereby alert the second or receiver radio apparatus. Once activated communication may take place between the two radio apparatus.

Two-way radio communication assemblies are known to transmit signals of sound and code through space via electromagnetic waves. Each radio set may have a receiver and a transmitter to generate and amplify a radio frequency carrier signal, modulate the carrier signal with intelligence and feed the modulated carrier signal to an antenna for radiation into space as electromagnetic waves. The receiver portion of the radio set demodulates the signal and thereby provides an audio transmission, for example. The radio frequency spectrum is the entire range of frequencies in which radio waves can be produced and each two-way radio assembly has a radio transmitter and radio receiver which are used together for two-way communication at a specified frequency within the radio frequency spectrum.

The emergency alert systems of the invention permit a user, i.e., a disabled person, to contact a second party capable of coming to the aid of the user. The alert systems are provided for individuals seeking greater independence, privacy and self-autonomy. For example, children, the elderly, those with disabilities and others may greatly benefit from the use of the alert systems of the invention. In addition to the application of the alert systems of the invention with these individuals, the systems may also be used by emergency personnel, for example. A long unfelt need is met by the alert systems of the present invention.

SUMMARY OF THE INVENTION

The emergency alert systems comprise a transmitting unit, a receiver unit and means to activate the transmitting unit. The transmitting and receiver units may be comprised of a two-way radio system such as a two-way radio system operating on FM frequency, for example. In one embodiment, such systems may include an activating means which causes one radio to send a signal to the second radio. Training manuals and instructional videos may further be provided to train assistance dogs for activating and operating the transmitting unit and how to perform and behave in combination with the emergency alert systems, for example.

Activation means may include a jack receptacle incorporated into the body and circuitry of the transmitting unit and which cooperates with a jack having a flexible toggle device for grasping by a trained service dog. The dog bites the toggle device and removes the jack from the receptacle to thereby activate a signal for transmission to the receiving unit. Once alerted, communication may ensue between the two radio apparatus.

The invention relates to alert systems for medical emergencies, for example. The emergency alert systems of the invention have various embodiments designed for specific purposes. The alert systems include a transmitting unit, a receiver unit and various activation means for the units. Modified, two-way radio units may be utilized in the alert system. Further, proximity transmitting means may be incorporated into the systems whereby the transmitting and receiver units cooperate therewith for specific emergency and alert purposes.

An object of the alert assembly is to aid those persons living with seizure disorders who may often need assistance, but do not necessarily need EMS services. With use of the assemblies of the invention the need for EMS is determined by the holder of the receiving unit. The assemblies are designed for use with assistance dogs for persons with disabilities, particularly those with seizure conditions.

These and other benefits of this invention will become clear from the following description by reference to the drawings.

DESCRIPTION OF THE PREFERRED EMBODIMENTS

The present invention relates generally to emergency alert systems and particularly to emergency alert systems for use with assistance dogs.

Figure 1:
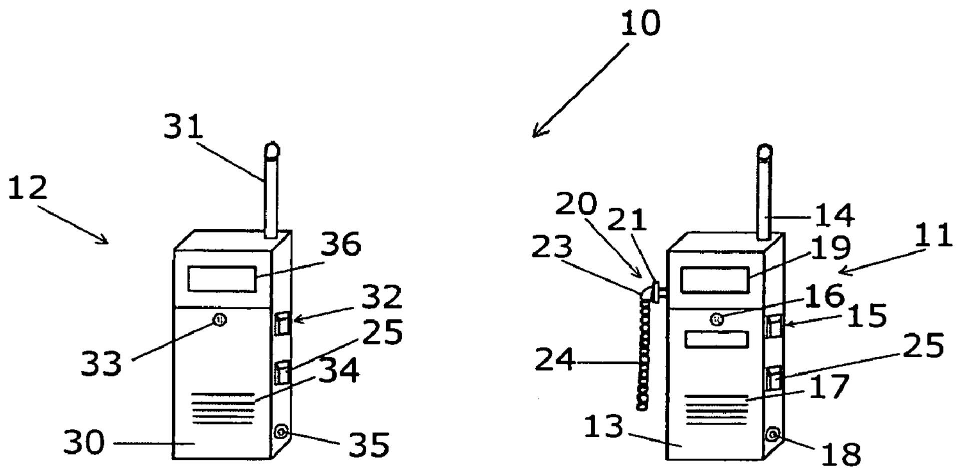
FIG. 1 shows an embodiment of the emergency alert system of the invention and showing the transmitter and receiver apparatus.

Referring to FIG. 1, the alert system embodiment 10 is shown to comprise the use of a modified two-way radio system 10. The alert system 10 includes a transmitting unit or apparatus 11 and a receiver unit or apparatus 12. The transmitting unit 11 is shown to have a body 13, with an antenna 14, a talk button 15, a microphone 16, a speaker 17 and a signal activation means 20. The transmitting unit 11 may further have a visual display 19, a reset button 18 and a channel lock button 25. The receiving unit 12 is shown to have a body 30 with an antenna 31, a call or talk button 32, a microphone 33 and a speaker 34. The transmission unit 12 may further have a reset button 35, a visual display 36 and a channel lock button 25.

The emergency alert systems of the invention may comprise a modified two-way radio system and wherein a signal activation means is provided in one of the radio apparatus. The signal activation means include several embodiments including a flexible toggle member which, when pulled from the radio apparatus activates the transmitting radio apparatus to thereby alert a second radio or receiver apparatus. Once activated communication may take place between the two radio apparatus.

The use of the channel lock button 25 has been found useful in the alert systems 10 so as to minimize any time delay between the transmitter unit 11 and the receiving unit 12 in that the units do not proceed through the auto scan operation to locate a free channel.

Figure 2:
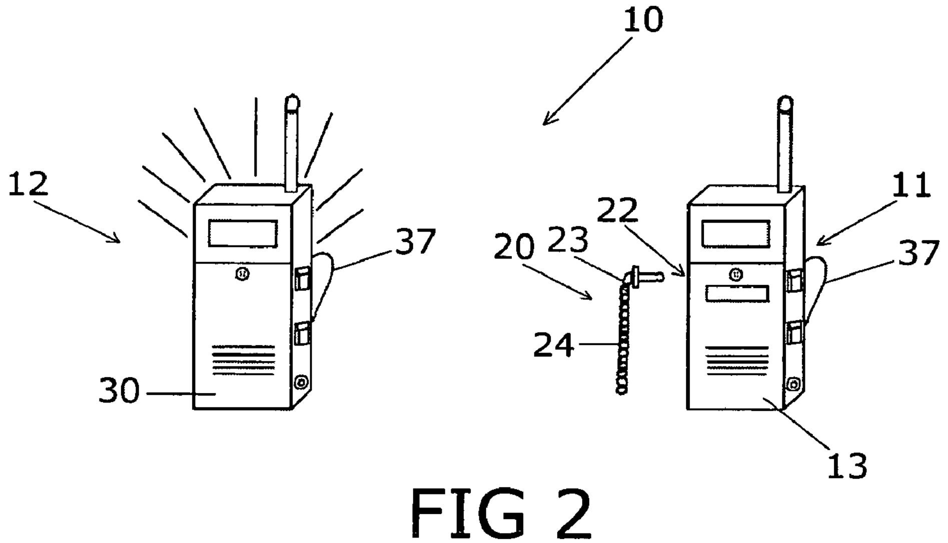
FIG. 2 shows the emergency alert system and shows the activation of the transmitter apparatus of FIG. 1.
Figure 3:
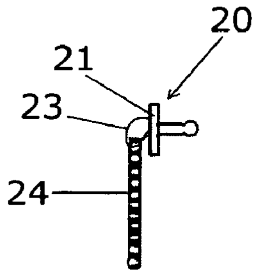
FIG. 3 shows the activation assembly of the emergency alert system of FIG. 1.

Referring to FIGS. 2 and 3, the activation means 20 of the transmitting unit 11 is shown to comprise a jack 21, such as a phono type plug 20 which is inserted into the jack terminal 22 on body 13 and connected to the circuitry within the transmitter body 13. The phono type plug 21 is shown to have a connector loop 23 to which a rip cord 24 comprising an approximately five to six inch flexible cotton rope or cord 24 is connected, for example. Service dogs are trained to grab and pull on cord 24 based upon the action of the wearer to whom the transmitting apparatus is connected by means of a belt clip 37, for example. The trained assistance dog can pull the cord or rope 24, for example, thus pulling the jack 21 from the transmitting unit 11. The flexible connector loop 23 may be a nylon fish line, for example, whereas the toggle cord 24 is preferably ½ inch diameter cotton rope approximately 5 inches in length. The use of a length of rope provides a suitable target for service dogs.

The phono plug 21, when inserted into the unit 11, permits the two-way radio to function normally. An FM radio such as a Remington® FRS Radio [model #RM-60DC] manufactured by TEKK Inc., for example, may be modified by the addition of a small phono type jack 20 and jack terminal 21 to the side of the transmitting unit body 13. The two-way radio apparatus may be analog or digital. Charging units (not shown) are also provided with the transmitting unit 11 and the receiving unit 12 for battery recharging purposes, as is known.

Figure 3A:
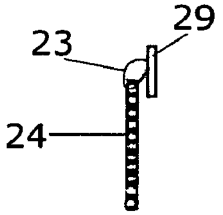

The jack 21 is frictionally held in jack terminal 22. Alternatively, this switch structure may be magnetic in operation whereby the jack is held to terminal 22 magnetically. The latter structure, as shown in FIG. 3*a* may be preferred where frequent alert uses are required. For example, the jack body 29, having connector loop 23 and rip cord 24 attached thereto, may be a magnetic structure to cooperate with the terminal of the transmitter body to thereby activate a signal when removed.

When the rip-cord 24 is pulled from the transmitter unit 11, the transmitter unit 11 emits an alarm sound for a predetermined time period, i.e., a few seconds. Following the alarm the unit 11 is left with an "open mic". This allows the individual with the receiver unit 12 to hear a distress call, dog barking, or the individual speaking. Depending upon the circuitry of the radio units 11 and 12, the receiver 12 may or may not have the capability of communicating back to the transmitting unit 11 once the rip-cord 24 is pulled. Preferably the receiver 12, upon activating the call button 32 (PTT), will have the capability of shutting off the microphone on the transmitter unit 11. By doing so the transmitter 11 would become the receiver and the receiver would become the transmitter, however, would do so only for the period of time that the call or "push to talk" button 32 (PTT) is depressed.

Figure 4:
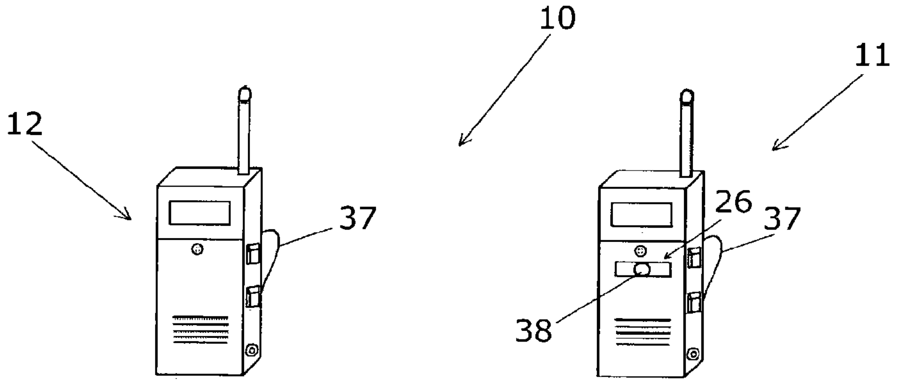
FIG. 4 is another embodiment of the emergency alert system.

Referring to FIG. 4, another embodiment of the alert system 10 is shown and which operates in a manner similar to the embodiment of FIGS. 1 and 2. The transmission unit 11 is shown having a mercury type switch 26 with a movable conductive member 38 to activate the transmitting unit 11 for operation. The disabled individual may wear the transmitting unit 11 by means of a belt clip 37, for example. This transmitting unit 11 will be activated by the disabled person when assuming a horizontal position, i.e., when falling down. Should the disabled person remain horizontal (indicating a seizure or fall) for more than a pre-determined time period, i.e., 10 seconds, the transmitting unit 11 will be activated by the conductive member 38 and will perform in the same manner as the previously described embodiment. This transmitting unit 11 may also be used with police, fireman and other emergency personnel as a safety tool. For the latter application, a by-pass switch may be added for situations when individuals may be working in a horizontal position for an extended period of time. For this embodiment a sounding alert system may be employed, which is known and presently used by firefighters.

Figure 6:
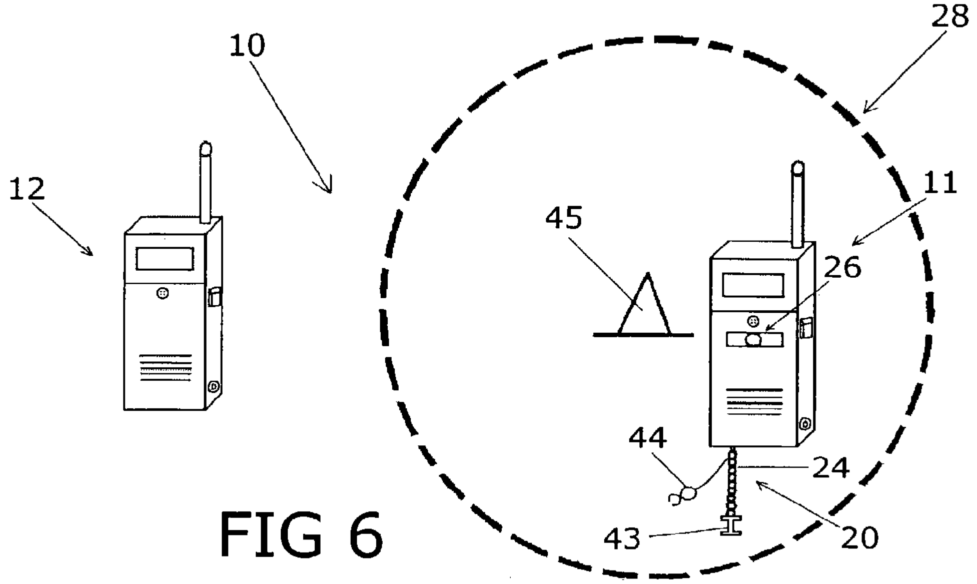
FIG. 6 is another embodiment of the emergency alert system.
Figure 7:
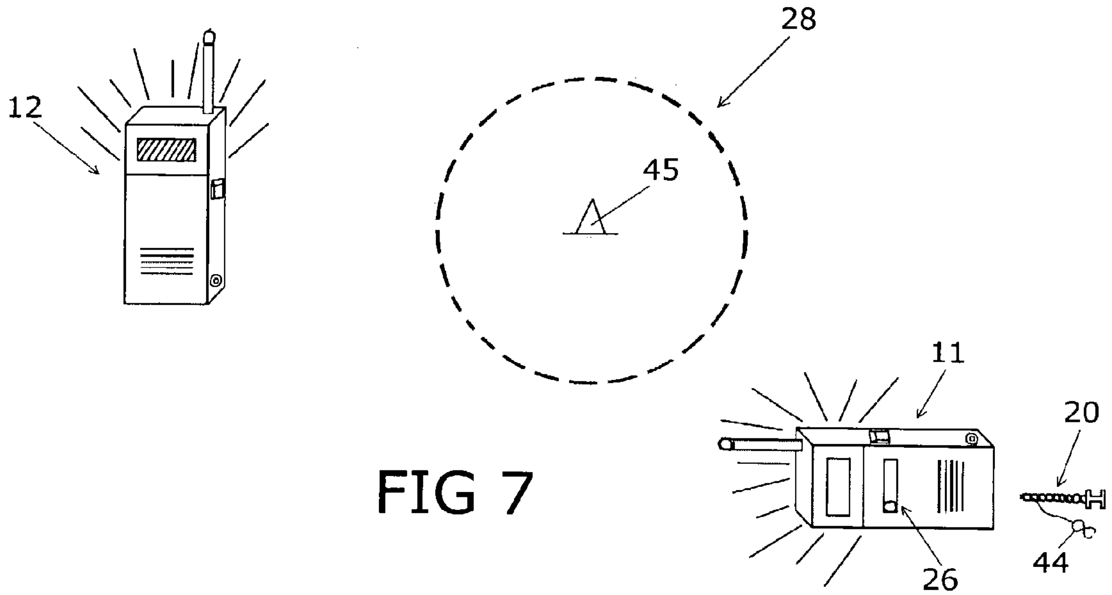
FIG. 7 shows the emergency alert system of FIG. 6 in a state of activation.

Referring to FIGS. 6 and 7, another embodiment of the alert system 10 is shown. This embodiment is shown to operate by means of a proximity type switch. The system is constructed and operates in a similar manner to an invisible fence system, as used by dog owners, for example. The elder, child or disabled individual wears transmitter unit 11. When the individual strays more than a predetermined distance, i.e., outside the perimeter range 28, or a distance from location 45, where receiver 12 is located, for example, the alarm will sound and the units will perform in the same manner as the above described embodiment. The call activation means 20 is shown to have a clip 44 which may be used for connection to a wheelchair, for example, so that the falling by the user from the wheelchair would activate the transmitting unit 11. The talk-back feature is important and may be used with animals or humans. Disabilities that limit cognitive function such as mental retardation and Alzheimer's disease could be served very well using this embodiment. A soft plastic pendant 43 is shown connected to cord 24. The latter design is specifically constructed for use with an assistance dog. The pendant 43 may be a soft plastic device utilized for instructional or promotional purposes.

Figure 5:
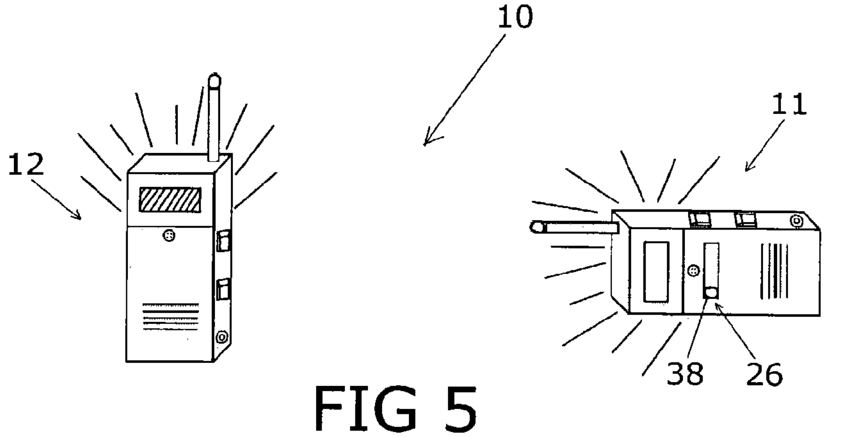
FIG. 5 shows the emergency alert system of FIG. 4 in a state of activation.

As shown in FIGS. 5, 6 and 7, the transmitter 11 is shown to have various activation means including a rip-cord 20, a mercury type switch 38 for activating the transmitter as well as the activation means when moved outside of the proximity range 28 of the proximity transmitter 45.

Figure 8:
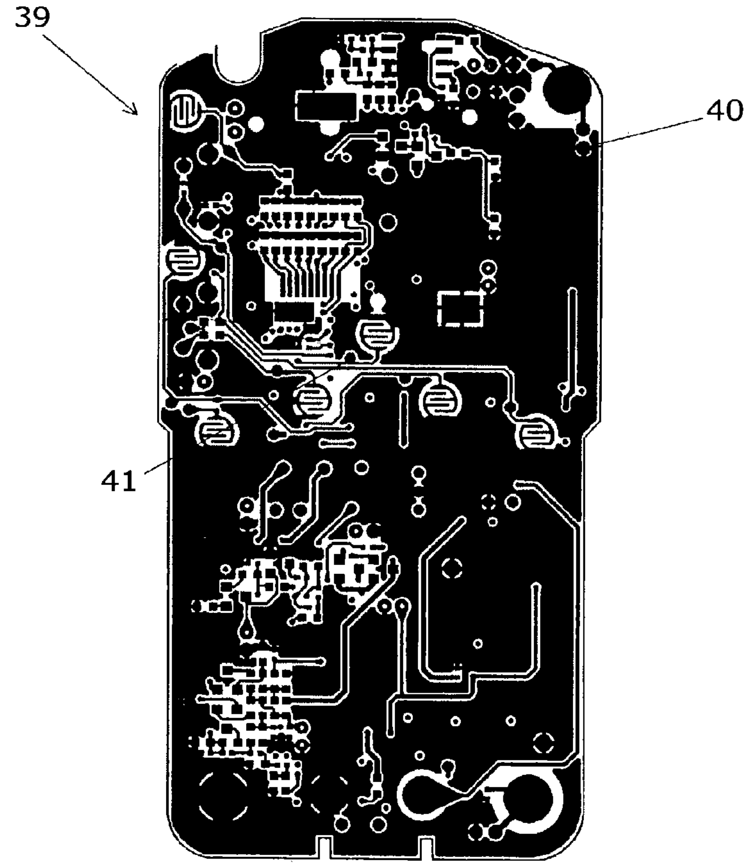
FIG. 8 is a top plan view of a circuit board utilized in the transmitter apparatus.
Figure 9:
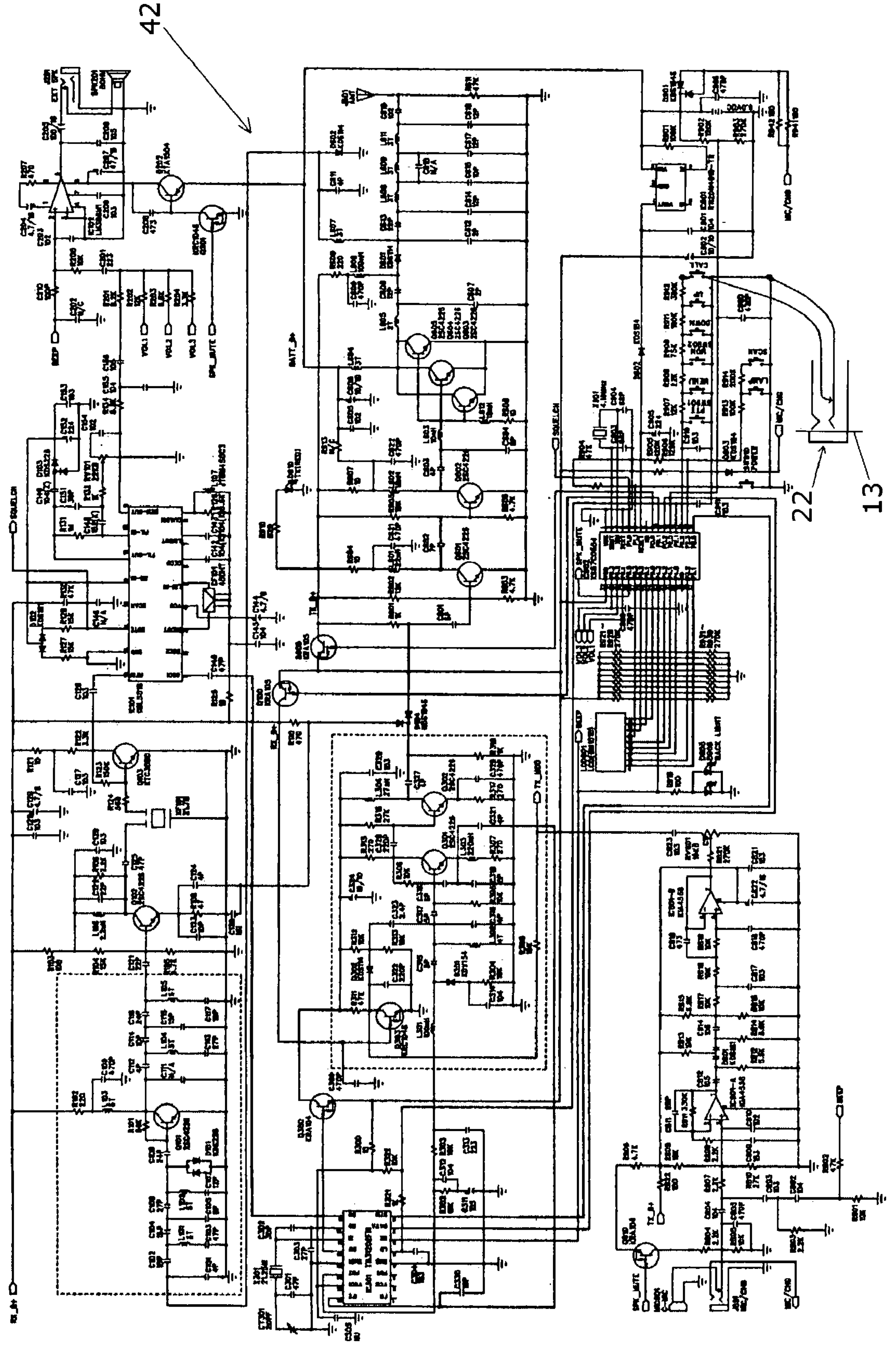
FIG. 9 is a schematic showing the modified electronic circuit of the transmitter apparatus.

FIG. 8 is a top plan view of a circuit board 39 showing connections 40 (ground) and 41 for the phono type jack receptacle 22 in body 13 of transmitter apparatus 11. FIG. 9 is a circuit diagram 42 also showing the connection of the jack receptacle 22 into the electronic circuitry of the FM radio transmitter 11. The jack terminal 22 connection is shown connected to the call button activation circuitry of the radio apparatus.

The purpose of the various alert system embodiments of this invention is to increase the autonomy and independence by use of these monitoring systems. The holder or wearer of the transmitting unit 11 can activate the system by pulling a cord or rope 24 or by falling to a prone position for a period longer than 10–15 seconds, for example. The rip-cord device 24 is intended for use by assistance dogs trained to pull the cord 24, thus activating the unit 11. Once activated the transmitting unit sends an alert tone to the second (receiving) unit and leaves an open microphone. Once "alerted" the second individual will check on the status of the individual holding the first unit 11. Alternatively, the rip-cord 24 may be attached to both a wheelchair, i.e., by clip 44 and to the person, i.e., via clip 37, in the wheelchair to thereby alert the receiving unit 12 should the person leave or fall from the chair.

The embodiments of the invention may include the addition of a locating system, i.e., by utilizing a small radar-like screen by which the receiving unit can locate the transmitting unit. Unlike more advanced technologies this system would have a relatively small range, perhaps up to two miles.

As many changes are possible to the embodiments of this invention, utilizing the teachings thereof, the description above and the accompanying drawings should be interpreted in the illustrative and not in the limited sense.

That which is claimed is:

1. An emergency alert system comprising:

a) a two-way radio system comprising at least a first radio apparatus and a second radio apparatus, said first and second radio apparatus having a speaker, a microphone, and a body having a side, said first radio apparatus having means to automatically activate a signal for sending to said second radio apparatus, said means to activate comprising a jack receptacle, located in said side of said first radio apparatus and incorporated into the circuitry of said first radio apparatus; and b) a jack device having a toggle device connected thereto, said jack device for the removable insertion in said jack receptacle, said toggle device further comprising a loop member connected to said jack device, a length of flexible rope attached at one end to said loop member and having a plastic pendant attached to the other end of said rope, said flexible rope having a diameter and said plastic pendant having a width which is greater than the diameter of said rope, whereby attachment of said rope to said loop device permits said rope to hang in a vertical position and to be spaced from the radio side and whereby said rope and plastic pendant of said toggle device are constructed and arranged to be held between the teeth of a trained service dog, whereby upon the removal of said jack device by the service dog causes a signal to be sent to said second radio, said signal being a radio-wave signal which activates an alert tone in said second radio and causes the microphone of said first radio apparatus to be open for communication.

2. The emergency alert system of claim 1, wherein said length of flexible rope is approximately 5 inches long and approximately 0.5 inches in diameter.

3. The emergency alert system of claim 2, wherein said first radio has a first attachment device connected thereto for attachment to a person and wherein said toggle device has a second attachment device connected thereto, said second attachment device having means for connection to a wheelchair.

4. The emergency alert system of claim 1, wherein said first and second radio apparatus each further have a talk button, a microphone and a speaker and wherein said means to activate said first radio apparatus is further comprised of a horizontally disposed switch structure having a movable conductive member and conductive end portions, said conductive end portions being incorporated into said circuitry of said first radio apparatus to thereby activate a radio wave signal to be sent to said second radio apparatus, whereby said movable conductive member contacts one said end portion when said radio apparatus is moved from a horizontal position.

5. The emergency alert system of claim 1, wherein said first and second radio apparatus are FM radios.

6. The emergency alert system of claim 5, wherein said first and second radio apparatus have a channel lock button and wherein said first and second radios are locked to operate on one FM channel.

7. The emergency alert system of claim 1, further comprising a perimeter signal and wherein said one radio apparatus has means to receive said perimeter signal, said means to receive being incorporated in said circuitry of said one radio apparatus to activate said signal sending means.

8. The emergency alert system of claim 1, wherein said activation means further includes a clip attached to said length of flexible rope, said clip being constructed and arranged for attachment to a wheelchair.

9. The emergency alert system of claim 1, wherein said jack receptacle and said jack device are magnetically held in position.

10. The emergency alert system of claim 1, wherein said first radio apparatus has means for attachment to a user of the system.

11. An emergency alert system comprising:

a) a two-way radio system comprising at least a first radio apparatus and a second radio apparatus, said first radio apparatus having means to automatically activate a signal sent to said second radio; and b) a talk button, a microphone and a speaker operatively incorporated in each said radio apparatus, said means to activate comprising a horizontally disposed switch structure having a movable conductive member and conductive end portions, said conductive end portions being incorporated into said circuitry of said one radio apparatus, said circuitry having a time-delay element and whereby when said horizontally disposed switch structure is moved from the horizontal position and said movable conductive member contacts one of said end portions a radio wave signal is sent after a predetermined time period from said first radio to said second radio to thereby provide a radio tone alert and whereby an open microphone is then provided on said first radio.

12. The emergency alert system of claim 11, wherein said means to activate further comprises a jack receptacle and a removable jack device, wherein said jack receptacle is incorporated into the circuitry of said first radio apparatus and said jack device has a toggle device connected thereto and wherein said toggle device comprises a length of flexible cotton rope with a specified diameter.

13. The emergency alert system of claim 12, wherein said first radio has an attachment device connected thereto for attachment to a person and wherein said toggle device has an attachment device constructed and arranged for connection to a wheelchair.

14. The emergency alert system of claim 12, wherein said length of flexible rope has a pendant connected thereto, said pendant having a width larger than said rope diameter.

15. The emergency alert system of claim 14, wherein said activation means is a magnetic switch whereby said jack and said jack receptacle are separable and magnetically held.

16. The emergency alert system of claim 11, wherein said first and second radio apparatus are FM radios and wherein each said radio has a channel lock button for locking to one FM channel.

17. The emergency alert system of claim 11, further comprising a perimeter signal and wherein said one radio apparatus has means to receive said perimeter signal, said means to receive being incorporated in said circuitry of said one radio apparatus to activate said signal sending means.

18. The emergency alert system of claim 11, wherein said first radio apparatus has means for attachment to a user of the system, wherein said first radio apparatus has a bypass switch to override the horizontal switch activation and wherein said predetermined time period is in the range of approximately 10–15 seconds.

19. An emergency alert system comprising:

a) a two-way radio system comprising at least a first radio apparatus and a second radio apparatus, said first radio apparatus having means to automatically activate a signal sent to said second radio, said means to activate comprising a jack receptacle incorporated into the circuitry of said first radio apparatus;

b) a jack having a toggle device connected thereto, said jack for the removable insertion in said jack receptacle and said toggle device being constructed and arranged to be held between the teeth of a trained service dog, said toggle device further comprising a flexible rope length having two ends and a diameter, a loop member connected at one end of said rope length, said loop member constructed and arranged to be connected to said jack, and a pendant member at the other end of said rope length, said pendant member constructed and arranged having a width larger than said rope diameter so that a service dog may grasp the toggle device between its teeth for removal of said jack, whereby upon the removal of said jack by the service dog causes a signal to be sent to said second radio apparatus;

c) a talk button, a microphone and a speaker operatively incorporated in said first and second radio apparatus;

d) a horizontally disposed switch structure having a movable conductive member and conductive end portions, said conductive end portions being incorporated into said circuitry of said first radio apparatus, and whereby when said movable conductive member contacts one of said end portions a radio wave signal is sent to said second radio; and e) an attachment device mounted to said first radio apparatus for attachment to a person and wherein said toggle device further has an attachment device constructed and arranged for connection to a wheelchair.

20. The emergency alert system of claim 19, wherein said jack receptacle and said jack device are magnetically held in position.

* * * * *